United States Patent Office 3,410,811
Patented Nov. 12, 1968

3,410,811
POROUS WEAK BASE ANION EXCHANGE RESINS FROM POLYVINYL CHLORIDE AND AMINES
Richard G. Bufton, Painesville, and Leo L. Benezra, Willowick, Ohio, assignors to Diamond Shamrock Corporation, a corporation of Delaware
No Drawing. Continuation-in-part of application Ser. No. 338,638, Jan. 20, 1964. This application Nov. 13, 1967, Ser. No. 682,533
8 Claims. (Cl. 260—2.1)

ABSTRACT OF THE DISCLOSURE

A weak-base anion-exchange resin of improved physical and chemical stability is produced by reacting particulate polyvinyl chloride resin with an aqueous amine solution at a temperature in excess of 100° C. Following amination the resin is further reacted with a polyfunctional agent having at least two amine-reactive groups.

BACKGROUND OF THE INVENTION

This is a continuation-in-part of our copending application Ser. No. 338,638, filed Jan. 20, 1964 and now abandoned.

This invention relates to novel anion-exchange resins and methods for their preparation, and more particularly to anion-exchange resins derived from polyvinyl chloride.

In order for an ion-exchange resin to be commercially successful it, of course, must possess the desired ion-exchange properties. In addition, however, the resin must be chemically and physically stable. Chemical stability is evidenced by the ability of the resin to retain its exchange capacity. Physical stability is evidenced by the ability of the resin to show a relatively small increase in volume in changing from the regenerated (e.g., free base) form to the exhausted (e.g., hydrochloride) form.

Weak-base anion-exchange resins prepared by reacting a polyvinyl halide with an amine have been known for some time. However, resins of this type heretofore prepared have suffered from several serious disadvantages which have decreased their usefulness to such an extent that there are no vinyl halide-based granular anion-exchange resins in common use today.

In U.S. Patent 2,304,637, there is described a method of making an anion-exchange resin by reacting polyvinyl chloride with an anhydrous amine in the presence of a potassium bromide-cupric chloride catalyst. This reaction is dangerously violent, often explosive; yields are low, and the product is of variable and doubtful composition and poor capacity.

British Patent 919,965 discloses a method for aminating polyvinyl chloride film in an aqueous medium, at temperatures up to 100° C. The product of this reaction, which is in film rather than granular form, is unstable to normal alkaline cycling conditions (e.g., 0.1 N alkali) in that such conditions cause a rapid decrease in capacity.

The aminated resin of British Patent 893,286 is made by reacting polyvinyl chloride with an aqueous amine at 85–100° C. in the presence of a swelling agent such as chlorobenzene. Besides being unstable to both acid and base at moderately high temperatures this resin expands to about 300% of its original volume during exhaustion.

STATEMENT OF THE INVENTION

In view of the disadvantages of the resins disclosed in the prior art, a principal object of this invention is to prepare an improved weak-based anion-exchange resin from polyvinyl chloride.

A further object is to prepare a granular, polyvinyl chloride-based anion-exchange resin which is characterized by high capacity and low volume change during the exchange cycle.

Still another object is to prepare an anion-exchange resin with a stable exchange capacity.

These and other objects will become apparent from the description and claims which follow.

It has now been found that a weak-base anion-exchange resin having an improved chemical and physical stability is obtained by reacting a porous, granular, polyvinyl chloride resin with an aqueous solution of a basic compound selected from the group consisting of ammonia and aliphatic mono- and polyamines having less than 13 carbon atoms per molecule, at a temperature of at least 100° C. and subsequently further reacting the aminated polyvinyl chloride resin with a polyfunctional compound having at least two amine-reactive groups. By the above method resins are obtained which, when compared to prior art resins, have an improved chemical stability, in that they are resistant to alkali and acid degradation even at high temperatures, and an improved physical stability, in that they exhibit little tendency to change volume during the exhaustion and regeneration cycles.

DESCRIPTION OF THE PREFERRED EMBODIMENTS

Polyvinyl chloride resins useful in the practice of the present invention are those having a porous structure and are preferably prepared by a suspension-type polymerization process. Bulk-polymerized material may, however, also be used if ground to the desired particle size. This desired particle size generally ranges within from 8 to 300 mesh, preferably 16–50 mesh. Polyvinyl chloride resins having a molecular weight in excess of 10,000, and preferably in excess of 80,000, are preferred.

As is stated hereinabove, the polyvinyl chloride resin is reacted with an aqueous solution of ammonia or an aliphatic amine. The amines particularly useful in the practice of the present invention include any of the aliphatic mono- and polyamines which have less than 13 carbon atoms per molecule. Monoamines which are useful in the practice of the present invention include methylamine and dimethylamine. Especially preferred at this time, however, are the polyamines such as ethylenediamine, diethylenetriamine, triethylenetetramine, tetraethylenepentamine, bis-(hexamethylene)triamine and 1,6-diaminohexane. Generally speaking the polyamines will afford final products having a greater capacity than those produced using the monoamines. The monoamines are, however, somewhat more economical to use and still yield resins having superior properties as compared with prior art resins.

In use, the amine will be reacted with the polyvinyl chloride resin in the form of an aqueous solution generally containing from 70–90%, by volume, of amine. The use of these aqueous solutions provides several advantages over prior art systems which require that the polyvinyl chloride resin be reacted with an anhydrous amine. As is stated hereinbefore, the use of an anhydrous system results in a process which is both difficult to control and gives low yields of a product of variable composition. Through the use of an aqueous system however, better control of both the reaction and the product are possible. Aqueous solutions also permit that the process may be run at higher temperatures than most prior art processes primarily because of the lessened increase in swelling of the polymer and it is believed that this increase in temperature results in a further improvement in the properties of the anion-exchange resin, particularly with regard to its resistance to acid and alkali degradation at high temperatures.

In the first stage of the preparation of the weak-base anion-exchange resin according to the practice of the present invention, the polyvinyl chloride resin is mixed with the aqueous solution of amine or ammonia. The molar ratio of amine to polyvinyl chloride (the latter calculated on a monomer basis) will depend in large part on the reactivity and functionality of the particular amine being used, and may be, for example, between 1:1 and 10:1.

This polyvinyl chloride-amine or ammonia mixture is then reacted at a temperature in excess of 100° C. for a period of time sufficient to carry out the reaction to the desired degree, as indicated by attainment of a satisfactory volume capacity in the product resin. The amount of time required for complete reaction will of course vary with the nature of the reactants and the temperature, it being generally understood that higher reaction temperatures decrease the amount of time which is required. While the reaction may ordinarily be run at atmospheric pressures it may be sometimes necessary or desirable to use a sealed reaction vessel or autoclave. This is particularly true in the case where a volatile amine is used.

After the reaction has proceeded to the desired degree of completion, the aminated polyvinyl chloride resin may be separated from the liquid phase and washed with water prior to continuing the reaction as is further described hereinbelow.

A further feature distinguishing the instant anion-exchange resin and the process for producing same from the prior art, lies in the additional reaction of the aminated polyvinyl chloride resin with a polyfunctional compound having at least two amine-reactive groups. Those skilled in the art will be familiar with the types of compounds useful in this capacity. Included are those compounds which contain at least two groups such as halide, acetate, sulphate and epoxide. Illustrative of these compounds are epichlorohydrin; 1,2,3,4-diepoxybutane; 2,2'-dichlorodiethyl ether; 1,4-dichlorobutane; 1,4-dichloro-2-butene; p-xylene dichloride and the like. The molar ratio of the polyfunctional, amine-reactive compound to the aminated polyvinyl chloride resin may of course be varied widely depending upon the properties desired in the final product. In general, however, ratios of from 0.03 to 1.0 mole of amine-reactive compound per hole of aminated polyvinyl chloride are effective. Likewise the reaction conditions are also subject to rather wide variations according to the nature of the reactants. For example, for the reaction of epichlorohydrin with aminated polyvinyl chloride, an aqueous system may be employed and temperatures within the range of from 70–100° C. are suitable.

It is believed that the reaction of the aminated polyvinyl chloride with the polyfunctional amine-reactive compound results in a cross-linked product. For example, the reaction of a vinyl chloride-methylamine resin with epichlorohydrin probably proceeds as follows:

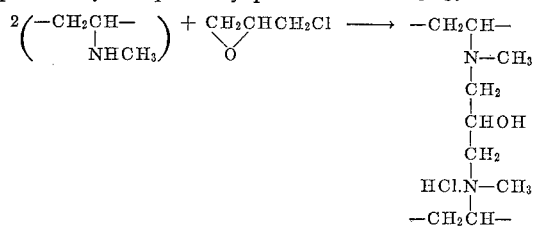

As a further example, the following reaction probably occurs between the same resin and p-xylylene dichloride:

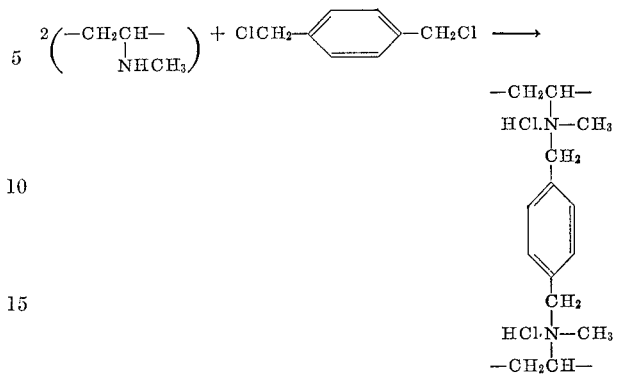

Since reactions between amines and reagents of the type described hereinabove are well known, it is not believed that an elaborate description of the types of polyfunctional, amine reactive compounds useful for this purpose is necessary, nor is an elaborate description of the products obtained. In general, however, the novel resins formed by reacting an aminated polyvinyl chloride resin with a polyfunctional compound having at least two amine-reactive groups will, after treatment with alkali to convert it to the free amine form if necessary, have a repeating unit of the formula

In this formula, R is the residue associated with the amine or ammonia and may, for example, be hydrogen, alkyl, alkylene or amino-bis-alkylene; in the latter two cases, the group is, of course, also attached to another amino group or the polymer chain. R' is the organic residue derived from the polyfunctional, amine-reactive compound. Thus, for example, after regeneration the polyvinyl chloride-methylamine-epichlorohydrin product will contain a repeating group with the formula

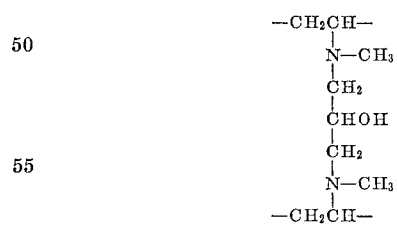

In order that those skilled in the art may more readily understand the present invention and certain preferred methods by which it may be carried into effect, the following illustrative examples are afforded.

Example 1

A 62.5 gram portion of PVC–450 (a granular polyvinyl chloride resin manufactured by Diamond Alkali Company) is reacted at 120° C. for 16 hours, with stirring, with an 80% (by volume) aqueous solution of 258 grams (2.3 moles) of diethylenetriamine. The resulting aminated polyvinyl chloride resin is separated, washed with deionized water and reacted for 16 hours at 80° C. with a solution of 15.7 grams of epichlorohydrin in 500 milliliters of water. The resultant weak-base anion-exchange resin is separated, washed with water and labeled Resin No. 1.

Example 2

The procedure of Example 1 is repeated with the exception that the amine used is a 40% aqueous solution of methylamine and, because of the low boiling point of said methylamine, the reaction takes place in an autoclave. The amine:PVC molar ratio is 3:1. The resultant weak-base anion-exchange resin is labeled Resin No. 2.

Example 3

62.5 grams of PVC–450 is reacted with an 80% aqueous solution of 258 grams of diethylenetriamine in a sealed autoclave at a temperature of 200° C., with stirring, for 16 hours. The aminated polyvinyl chloride resin is separated from the reaction mixture, washed with water and labeled Resin No. 3.

Example 4

According to one embodiment of British Patent No. 919,965, 62.5 grams of PVC–450 resin is reacted with a 70% aqueous solution of diethylenetriamine for 2 hours at 100° C. The resultant product is separated, rinsed with methanol and reacted overnight at 100° C. with an additional portion of 80% aqueous diethylenetriamine. The final resin is then separated, washed with water and labeled Resin No. 4.

Example 5

The procedure of Example 4 is repeated with the exception that the treatment with the 80% aqueous solution of diethylenetriamine takes place over a period of 2 hours rather than overnight. The resultant weak-base anion-exchange resin is labeled Resin No. 5.

Example 6

According to a further embodiment of British Patent 919,965, 62.5 grams of PVC–450 is reacted for 4 hours at 95–100° C. with an 80% aqueous hexamethylenediamine solution. The resultant resin is labeled Resin No. 6.

Example 7

According to the procedure of British Patent 893,286, 12.5 grams of PVC–450, 56.5 milliliters of chlorobenzene and an 81.5% (by volume) aqueous solution of 92.3 grams of bis(hexamethylene)triamine is reacted overnight at 100° C. The resultant resin is removed by filtration, washed with methanol and labeled Resin No. 7. A portion of this Resin No. 7 is extracted for 2 hours with methanol and labeled Resin No. 8. In turn, a portion of Resin No. 8 is dried for 2 hours at 100° C. and is labeled Resin No. 9.

Example 8

The procedure of Example No. 7, including the extraction and drying of the resin, is repeated and the resin is labeled Resin No. 10.

Example 9

An attempt is made to prepare an anion-exchange resin according to the procedure of Example 7 only employing diethylenetriamine instead of the bis(hexamethylene)triamine. By this practice, however, an unusable mass of material is obtained rather than a granular product.

Table I sets forth the weak base capacity (in equivalents per liter of resin, ±0.03), the bed capacity (in milliequivalents per 0.1 mole of resin, ±0.2) and percent volume expansion of the various resins when contacted in the basic form with an excess of 0.1 N hydrochloric acid. These values are reported in the first instance as they appear shortly following the formation of the resins. The values are also reported after contacting the resins for two consecutive 7 day periods with an excess of 0.1 N hydrochloric acid at a temperature of 90° C.

TABLE I

| Resin No. | Time | Weak-base Capacity [1] | Bed Capacity [2] | Percent Bed Capacity Loss [3] | Percent Expansion |
|---|---|---|---|---|---|
| 1 | Initial | 2.66 | 42.0 | | 15 |
|   | 7 Days [4] | 2.43 | 40.0 | 5 | 28 |
|   | 14 Days [4] | 2.38 | 41.0 | 2 | 24 |
| 2 | Initial | 1.86 | 22.0 | | 46 |
| 3 | Initial | 2.28 | 33.0 | | 34 |
|   | 7 Days | 1.93 | 29.0 | 12 | 44 |
|   | 14 Days | 2.00 | 30.0 | 9 | 48 |
| 4 | Initial | 2.46 | 30.0 | | 12 |
|   | 7 Days | 1.36 | 17.0 | 43 | 20 |
|   | 14 Days | 1.31 | 16.0 | 47 | 15 |
| 5 | Initial | 1.53 | 10.0 | | 15 |
|   | 7 Days | 1.22 | 8.6 | 14 | 7 |
|   | 14 Days | 1.22 | 8.0 | 20 | 15 |
| 6 | Initial | 1.71 | 12 | | 14 |
|   | 7 Days | 1.20 | 9.8 | 19 | 8 |
|   | 14 Days | 1.37 | 9.6 | 20 | 36 |
| 7 | Initial | 1.88 | 31.2 | | 165 |
|   | 7 Days | 1.54 | 27.7 | 11 | 189 |
|   | 14 Days | 1.62 | 29.2 | 10 | 178 |
| 8 | Initial | 1.88 | 30.0 | | 169 |
| 9 | Initial | 1.51 | 21.4 | | 27 |
| 10 | Initial | 2.83 | 17.0 | | 50 |
|   | 7 Days | 2.57 | 15.4 | 10 | 67 |
|   | 14 Days | 2.42 | 14.0 | 18 | 43 |

[1] Weak base capacity in equivalents/liter of anion resin.
[2] Bed capacity in milliequivalents/0.1 mole of polyvinyl chloride polymer.
[3] Percent bed capacity loss per 0.1 mole of polyvinyl chloride polymer.
[4] Capacities and expansion after contact with 0.1 N HCl at 90° C.

From an examination of the data presented in Table No. I it will be seen that only Resin No. 1, manufactured according to the practice of the present invention, shows an optimum combination of physical and chemical stability; chemical stability evidenced by substantially no capacity loss even after 14 days treatment with hot acid, physical stability evidenced by a minimum amount of swelling. Other resins fail to meet commercial standards in that they are lacking in either physical or chemical stability or, if appearing to exhibit some degree of both chemical and physical stability, fail owing to the difficulty in obtaining reproduceable results.

Example 10

A portion of Resin No. 6 is treated for 7, 14 and 21 days with 0.1 N hydrochloric acid at 90° C. Table II compares the effect on bed capacity of this treatment with the effect of the same treatment on Resin No. 1 (resin of the present invention).

TABLE II

| Resin | Day | Bed Capacity | Percent Bed Capacity Loss |
|---|---|---|---|
| 6 |  | 12 |  |
|   | 7 | 9.8 | 19 |
|   | 14 | 9.6 | 20 |
|   | 21 | 5.2 | 56 |
| 1 |  | 42 |  |
|   | 7 | 40 | 5 |
|   | 14 | 41 | 2 |

It will thus be seen that a resin made by a prior art process (Resin 6) continues to lose capacity with use eventually resulting in a useless resin that will require frequent replacement. Resins of the instant invention (Resin 1), however, show excellent chemical stability and hence may be used without replacement for a much greater length of time.

While the invention has been described with reference to certain preferred embodiments thereof, it is not to be so limited since changes and alterations may be made therein which are within the full and intended scope of the appended claims.

We claim:
1. A method for the production of a weak-base anion-exchange resin which method comprises the steps of,
    (A) Reacting a porous, granular, polyvinyl chloride resin with an aqueous solution of a basic compound selected from the group consisting of ammonia and aliphatic mono- and polyamines having less than 13 carbon atoms per molecule at a temperature of at least 100° C. and

(B) Further reacting the product from step (A) with a polyfunctional compound having at least two amine-reactive groups and selected from the group consisting of epichlorohydrin; 1,2,3,4-diepoxybutane; 2,2'-dichlorodiethyl ether; 1,4-dichlorobutane; 1,4-dichloro-2-butene and p-xylylene dichloride.

2. A method as in claim 1 wherein the ratio of the basic compound to the polyvinyl chloride resin is within the range of from 1:1 to 10:1.

3. A method as in claim 1 wherein the polyvinyl chloride resin is a suspension polymerized resin having a particle size of about 16–50 mesh and a molecular weight of at least about 80,000.

4. A method as in claim 1 wherein the basic compound is diethylenetriamine.

5. A method as in claim 1 wherein the polyfunctional compound is epichlorohydrin.

6. A weak-base anion-exchange resin produced by the method of claim 1 having a repeating unit of the formula

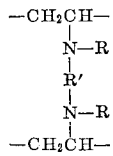

wherein R is selected from the group consisting of hydrogen and the organic residue of an amine selected from the group consisting of mono- and polyamines having less than 13 carbon atoms per molecule and R' is the organic residue of a polyfunctional compound having at least two amine-reactive groups and selected from the group consisting of epichlorohydrin; 1,2,3,4-diepoxybutane; 2,2'-dichlorodiethyl ether; 1,4-dichlorobutane; 1,4-dichloro-2-butene and p-xylylene dichloride.

7. A resin as in claim 6 wherein R is the organic residue of diethylenetriamine.

8. A resin as in claim 6 wherein R' is the organic residue of epichlorohydrin.

References Cited

UNITED STATES PATENTS

| | | | |
|---|---|---|---|
| 2,898,309 | 8/1959 | Greer | 260—2.1 |
| 3,147,214 | 9/1964 | Kressman et al. | 210—24 |
| 3,210,299 | 10/1965 | Hagge et al. | 260—2.1 |

FOREIGN PATENTS

| | | |
|---|---|---|
| 893,286 | 4/1962 | Great Britain. |
| 919,965 | 2/1963 | Great Britain. |

WILLIAM H. SHORT, *Primary Examiner.*

M. GOLDSTEIN, *Assistant Examiner.*